United States Patent
Farhoodfar et al.

(10) Patent No.: US 8,090,013 B2
(45) Date of Patent: Jan. 3, 2012

(54) METHOD AND SYSTEM OF PROVIDING A HIGH SPEED TOMLINSON-HARASHIMA PRECODER

(75) Inventors: Arash Farhoodfar, Irvine, CA (US);
Kishore Kota, Aliso Viejo, CA (US);
Alan Kwentus, Coto de Caza, CA (US);
David Hwang, Fairfax, VA (US)

(73) Assignee: Broadcom Corporation, Irvine, CA (US)

( * ) Notice: Subject to any disclaimer, the term of this patent is extended or adjusted under 35 U.S.C. 154(b) by 968 days.

(21) Appl. No.: 12/043,751

(22) Filed: Mar. 6, 2008

(65) Prior Publication Data
US 2008/0225937 A1    Sep. 18, 2008

Related U.S. Application Data

(60) Provisional application No. 60/918,141, filed on Mar. 15, 2007.

(51) Int. Cl.
*H03H 7/30* (2006.01)
*H04B 15/00* (2006.01)
*H04N 5/00* (2011.01)

(52) U.S. Cl. .......... 375/232; 375/285; 348/607

(58) Field of Classification Search .......... 375/232, 375/285; 348/607
See application file for complete search history.

(56) References Cited

U.S. PATENT DOCUMENTS

| | | | | |
|---|---|---|---|---|
| 5,040,191 A | * | 8/1991 | Forney et al. | 375/263 |
| 5,537,382 A | * | 7/1996 | McLaughlin et al. | 369/59.24 |
| 5,841,484 A | * | 11/1998 | Hulyalkar et al. | 348/607 |
| 5,881,363 A | * | 3/1999 | Ghosh et al. | 725/125 |
| 6,411,657 B1 | * | 6/2002 | Verbin et al. | 375/285 |
| 6,690,739 B1 | * | 2/2004 | Mui | 375/265 |
| 2003/0016770 A1 | * | 1/2003 | Trans et al. | 375/346 |
| 2005/0141460 A9 | * | 6/2005 | Currivan et al. | 370/335 |

OTHER PUBLICATIONS

Parhi, K., et al., "Pipelining Tomlinson-Harashima Precoders", IEEE 802.3an Task Force Presentation, Sep. 2004, pp. 1-14, http://grouper.ieee.org/groups/802/3/an/public/sep04/parhi_1_0904.pdf, Ottawa, Canada.
Parhi, K., "VLSI Digital Signal Processing System Design and Implementation", John Wiley & Sons, Inc., 1999, pp. 313-375, New York, U.S.
Kota, K., et al., "Programmable THP Analysis and Implementation", IEEE 802.3an task force presentation, Mar. 2005, pp. 1-23, http://grouper.ieee.org/groups/802/3/an/public/mar05/kota_1_0305.pdf.

\* cited by examiner

*Primary Examiner* — David C. Payne
*Assistant Examiner* — Sarah Hassan
(74) *Attorney, Agent, or Firm* — McAndrews, Held & Malloy, Ltd.

(57) ABSTRACT

Herein described are at least a method and a system for implementing a high speed Tomlinson-Harashima Precoder. The method comprises using an L-tap transpose configuration of a Tomlinson-Harashima Precoder and processing a first discrete time sampled sequence using said L coefficients and L state variables by clocking the L-tap Tomlinson-Harashima Precoder using a clock signal wherein the clock signal has a clock rate equal to one half the symbol rate of the discrete time sampled sequence. In a representative embodiment, an L-tap Tomlinson-Harashima Precoder comprises a single integrated circuit chip, wherein the integrated circuit chip comprises at least one circuitry for processing a discrete time sampled sequence using L coefficients and L state variables by way of clocking the discrete time sampled sequence using a clock signal having a clock rate that is one half the symbol rate of the discrete time sampled sequence.

30 Claims, 7 Drawing Sheets

US 8,090,013 B2

METHOD AND SYSTEM OF PROVIDING A HIGH SPEED TOMLINSON-HARASHIMA PRECODER

CROSS-REFERENCE TO RELATED APPLICATIONS/INCORPORATION BY REFERENCE

This application makes reference to, claims priority to, and claims benefit from U.S. Provisional Patent Application Ser. No. 60/918,141 entitled "METHOD AND SYSTEM OF PROVIDING A HIGH SPEED TOMLINSON-HARASHIMA PRECODER" filed on Mar. 15, 2007, the complete subject matter of which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

For a Tomlinson-Harashima Precoder, an obstacle to high speed circuit implementation results from the presence of a modulo operator. It is often difficult to implement a Tomlinson-Harashima Precoder because the modulo operator acts as a non-linear element within a feedback loop configuration. For example, the Tomlinson-Harashima Precoder (THP) may be implemented using a modified input $(d(n)+v(n))$ followed by a linear IIR filter having a z-transform, $1/C(z)$, where $d(n)$ corresponds to the input and $v(n)$ corresponds to a compensation or adjustment term. Furthermore, the IIR filter may then be pipelined using previously known techniques such as clustered look-ahead or scattered look-ahead techniques. The compensation term, $v(n)$, is determined by assessing its range of values. Unfortunately, the range of values that $v(n)$ may take is significantly large, resulting in very complex implementations.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Various aspects of the invention provide at least a method and a system for providing a high speed Tomlinson-Harashima Precoder (THP). In accordance with the various aspects of the invention, the high speed Tomlinson-Harashima Precoder (THP) may be implemented using circuitry that processes a discrete time sequence using one or more state variables. The various aspects and representative embodiments of the method and high speed THP are substantially shown in and/or described in connection with at least one of the following figures, as set forth more completely in the claims.

These and other advantages, aspects, and novel features of the present invention, as well as details of illustrated embodiments, thereof, will be more fully understood from the following description and drawings.

DETAILED DESCRIPTION OF THE INVENTION

Figure 1A:
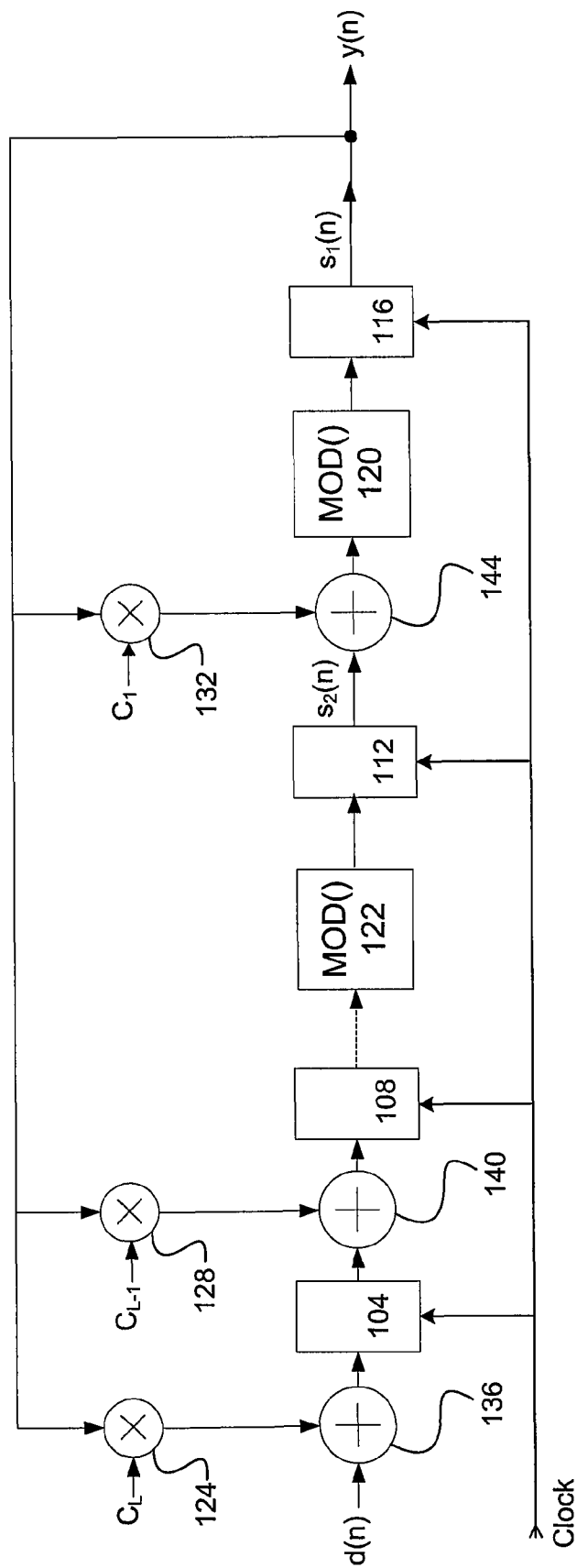
FIG. 1A is a block diagram of a configuration of a transpose form of an L-tap Tomlinson-Harashima Precoder (THP) in accordance with an embodiment of the invention.

Various aspects of the invention can be found in at least a method for providing a high speed Tomlinson-Harashima Precoder (THP). The method comprises parallel processing of a discrete time signal input using a reduced clock rate. The method is generated by using and applying one or more sets of equations based on a transpose form configuration of an L-tap Tomlinson-Harashima Precoder (THP). The transpose form configuration may be alternatively described as a transverse form configuration. The various aspects of the invention provide for a reduction of the clock rate while maintaining the symbol rate. The symbol rate corresponds to the data rate of the discrete time signal. The symbol rate may be defined as the rate in which the discrete time signal data sequence is received or output by the THP. In accordance with the various aspects of the invention, a pipelined high speed THP may be implemented using circuitry that is defined by one or more equations. In accordance with the various aspects of the invention, a high speed THP may be used to provide high speed parallel processing of data at a reduced clock rate, such that the THP's clock operates at an integer fraction (i.e., $1/n$, where n is an integer) of the symbol rate. In a preferred embodiment, the high speed THP may operate at one-half (i.e., $\frac{1}{2}$) the symbol rate.

Various aspects of the invention utilize a transpose form or transpose configuration of an L-tap Tomlinson-Harashima Precoder to implement a high speed Tomlinson-Harashima Precoder. In a representative embodiment, the method comprises adding one or more modulo operators to one or more stages of the transpose form of the L-tap THP. For example, a modulo operator may be appropriately inserted into a stage immediately preceding the first stage in the transpose form configuration. The modulo operator described in the one or more embodiments of the present application may represent a modulo 2M operator, where M corresponds to an integer value. The modulo 2M operator may be denoted as $\text{Mod}_{2M}(x)$. For the sake of simplicity, the $\text{Mod}_{2M}(x)$ operator may be expressed in the present application as $\text{Mod}(x)$. The modulo 2M operator may be defined as a function which maps a real input value, x, to a real output value, y, over a range $[-M, M)$, such that y and x differ exactly by an integer multiple of 2M.

Thus, for example, a Mod 2M operator, when M=1, corresponds to a Mod 2 or Modulo 2 operator that performs a Mod 2 or Modulo 2 operation. After adding the one or more modulo operations to the transpose form of the L-tap THP, one or more equations may be generated from the modified transpose form configuration of the L-tap THP. These one or more equations may be mathematically simplified such that a high speed THP may be easily implemented using circuitry. In a representative embodiment, the circuitry may comprise one or more multipliers, one or more adders, and a multiplexer. In a representative embodiment, the THP may be employed in a 10Gbase-T system. A transceiver may utilize such a THP for effectively transmitting data at 10 Gbit/sec over Ethernet, for example.

FIG. 1A is a block diagram of a configuration of a transpose form of an L-tap Tomlinson-Harashima Precoder (THP) in accordance with an embodiment of the invention. The L-tap THP comprises L stages. Each stage may comprise a multiplier, an adder, a register, and a modulo operator, for example. For example, the configuration shown in FIG. 1A comprises two modulo operators 120, 122 situated in the first two stages of the L-tap THP. In a representative embodiment, each of the two modulo operators 120, 122 performs a modulo 2M operation on its operand wherein the output of the modulo 2M operation comprises a range of values between −M and +M, inclusive of −M. A typical L-tap transpose form configuration comprises a single modulo operator in the first stage of an L-tap or L stage THP. The representative embodiment shown in FIG. 1A incorporates the use of one additional modulo operator compared to the typical L-tap transpose form THP. The system comprises L stages that are implemented using a plurality of flip-flops or registers 104, 108, 112, 116, a plurality of multipliers 124, 128, 132, and a plurality of adders 136, 140, 144. In FIG. 1A, the plurality of adders comprises an Lth adder 136, an (L−1)th adder 140, . . ., and a $1^{st}$ adder 144. For the sake of simplicity, one or more adders between the (L−1)th adder 140 and the $1^{st}$ adder 144 are not shown. The plurality of multipliers 124, 128, 132 comprises an Lth multiplier 124, an (L−1)th multiplier 128, . . ., and a $1^{st}$ multiplier 132. For the sake of simplicity, one or more multipliers between the (L−1)th multiplier 128 and the $1^{st}$ multiplier 132 are not shown. The plurality of registers 104, 108, 112, 116 comprises an Lth register 104, an (L−1)th register 108, . . ., a $2^{nd}$ register 112, and a $1^{st}$ register 116. For the sake of simplicity, one or more registers between the (L−1)th register 108 and the $2^{nd}$ register 112 are not shown. For example, the first stage of the L-tap transpose form configuration comprises a register 116, a modulo operator 120, an adder 144, and a multiplier 132. As shown, the input of the THP is a discrete time signal, d(n), while the output of the THP is a discrete time signal, y(n). The signal, y(n), is fed back as an input to the plurality of multipliers 124, 128, 132. A plurality of coefficients, $c_L, c_{(L-1)}, \ldots, c_1$ are input into the plurality of multipliers 124, 128, 132. The plurality of coefficients comprises coefficients of an adaptive digital filter. The subscripts of the coefficients may be used to identify the one or more adders 136, 140, 144, multipliers 124, 128, 132, and registers 104, 108, 112, 116 of the L-Tap THP. The adaptive digital filter may comprise a block LMS adaptive digital filter, for example. The coefficients may be pre-computed before processing is performed by the THP.

Figure 1B:
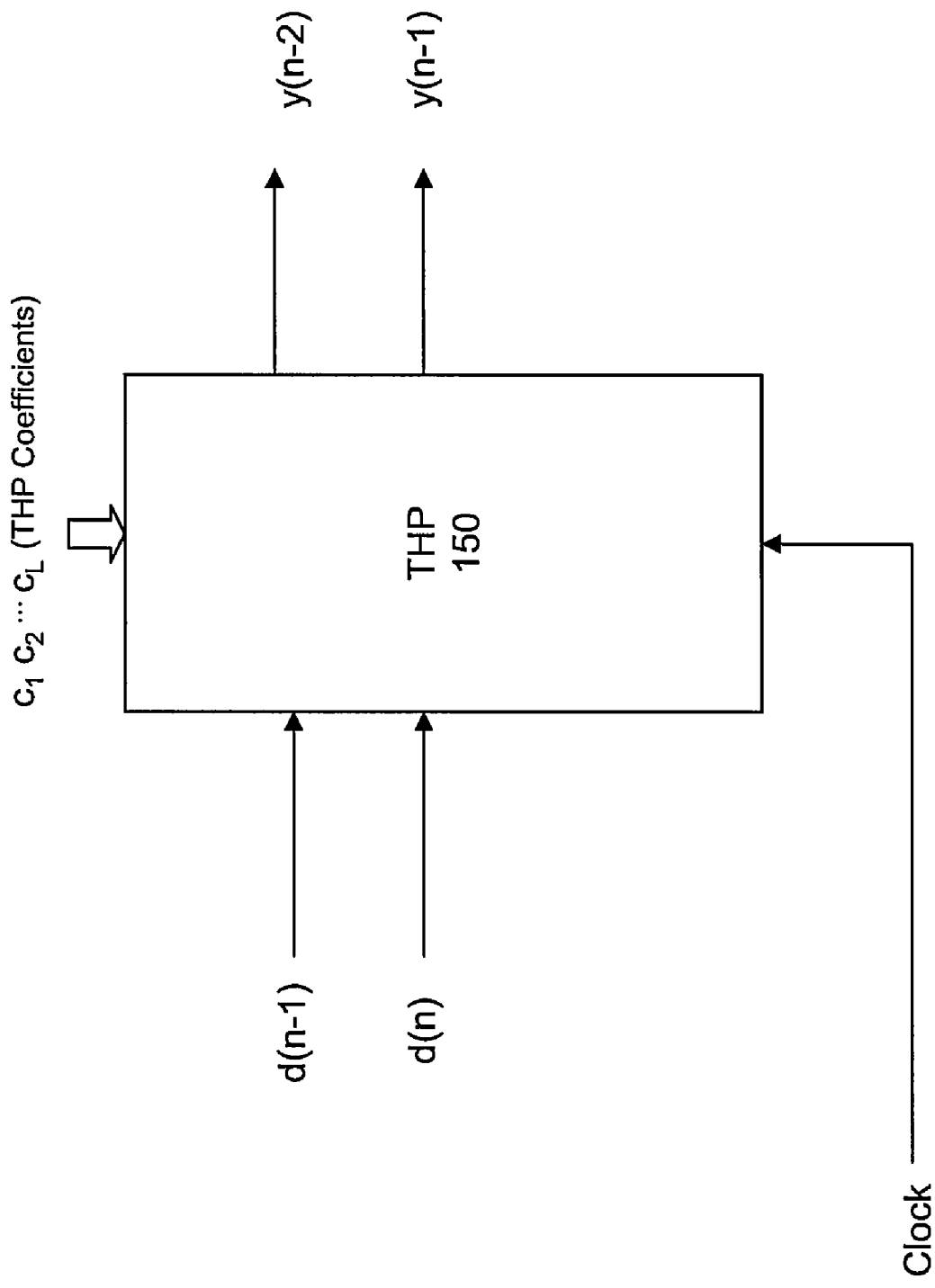
FIG. 1B is a top level block diagram of a high speed Tomlinson-Harashima Precoder (THP), in accordance with a preferred embodiment of the invention.

FIG. 1B is a top level block diagram of a high speed Tomlinson-Harashima Precoder (THP) 150, in accordance with a preferred embodiment of the invention. The THP 150 receives discrete sampled inputs d(n) and d(n−1) as a function of time. The THP 150 generates outputs y(n−1) and y(n−2). The THP 150 also receives inputs $c_1, c_2, \ldots, c_L$, as shown. The inputs $c_1, c_2, \ldots, c_L$, comprise coefficients of an adaptive filter, for example. As illustrated, the THP 150 is clocked by a clock having a clock rate that is one-half of the symbol rate of the THP 150.

Figure 2:
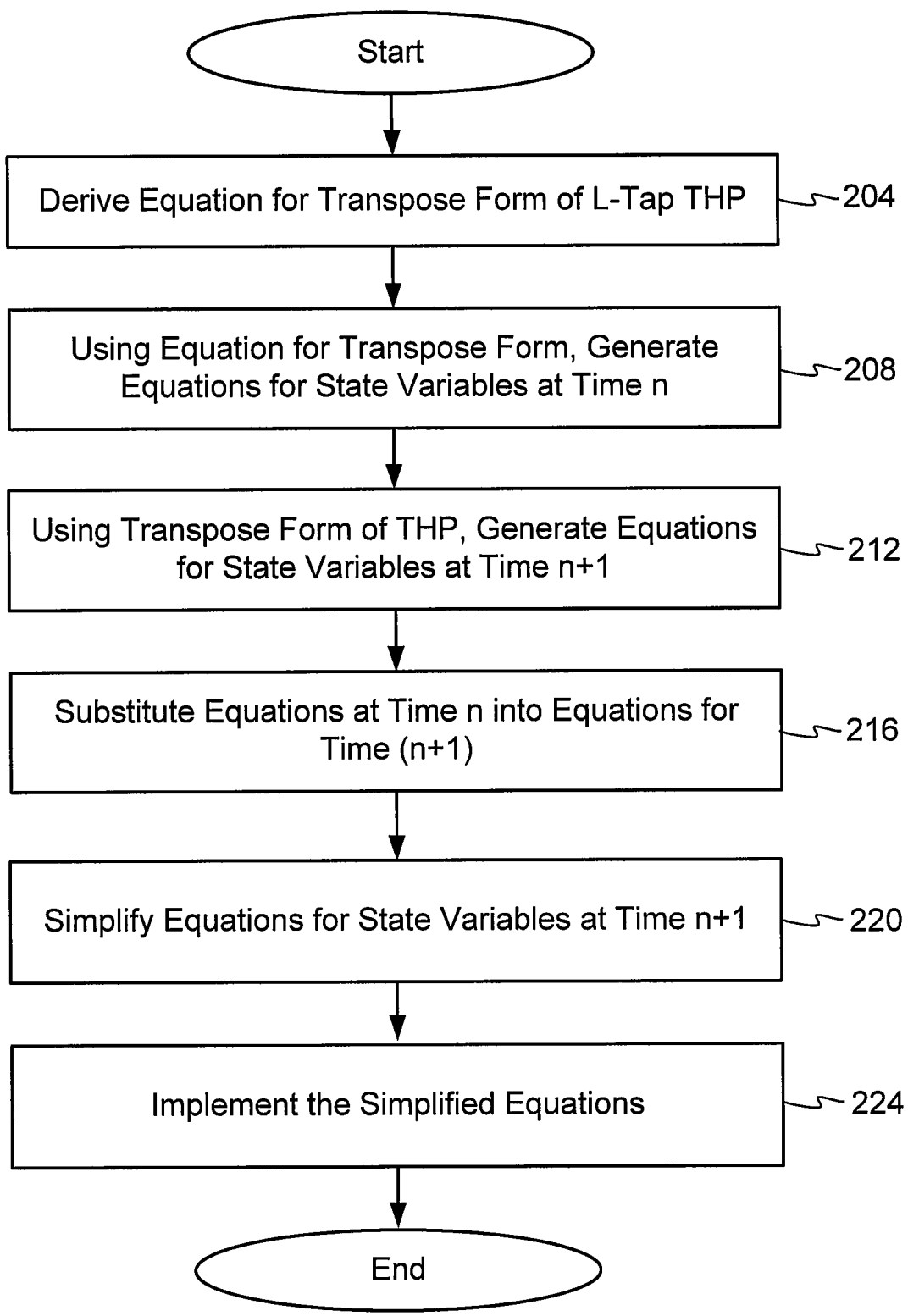
FIG. 2 is an operational flow chart illustrating a method of implementing a high speed L-tap Tomlinson-Harashima Precoder (THP) by way of using a transpose form configuration for an L-tap THP, in accordance with an embodiment of the invention.

FIG. 2 is an operational flow chart illustrating a method of implementing a high speed L-tap Tomlinson-Harashima Precoder (THP) by way of using a transpose form configuration for an L-tap THP, in accordance with an embodiment of the invention. At step 204, the method comprises expressing the transpose form of an L-tap THP using a corresponding equation, y(n) using a number of state variables. The L-tap THP may comprise a 16-tap THP or a 4-tap THP, for example. In the case of a 16-tap THP, sixteen state variables may be used while in the case of a 4-tap THP, four state variables may be used. In a representative embodiment, the L-tap transpose form configuration described in connection with FIG. 1A may be simplified to that of a 4-tap THP, and this 4-tap THP may be used to generate a corresponding equation. For example, the following equation, which expresses the output of the transpose form of a 4-tap THP, may be used if the L-tap transpose form configuration shown in FIG. 1A is simplified into that of a 4-tap transpose form:

$$y(n)=\text{Mod}(\text{Mod}(d(n-4)+y(n-4)c_4+y(n-3)c_3+y(n-2)c_2)+y(n-1)c_1)$$

Next at step 208, a set of L equations may be used to represent y(n). In a representative embodiment using a 4-tap THP, for example, a set of four equations may be used to represent the preceding equation for y(n). In the case of an L-tap THP, the equation for y(n) may be expressed as function of (n−1) by way of using L state variables. Thus, y(n) may be expressed in terms of L state variables. In the case of a 4-tap THP, four state variables may be used. For example, the four state variables, $s_1, s_2, s_3$, and $s_4$ may be used to describe y(n) in an exemplary 4-tap THP, and may be expressed as follows:

$$s_4(n-3)=d(n-4)+y(n-4)c_4$$

$$s_3(n-2)=s_4(n-3)+y(n-3)c_3$$

$$s_2(n-1)=\text{Mod}(s_3(n-2)+y(n-2)c_2)$$

$$s_1(n)=\text{Mod}(s_2(n-1)+y(n-1)c_1) \text{ where } (y(n)=s_1(n))$$

These equations may be converted into the following set of equations:

$$s_4(n)=d(n-1)+s_1(n-1)c_4$$

$$s_3(n)=s_4(n-1)+s_1(n-1)c_3$$

$$s_2(n)=\text{Mod}(s_3(n-1)+s_1(n-1)c_2)$$

$$s_1(n)=\text{Mod}(s_2(n-1)+s_1(n-1)c_1)$$

For the case of a 4-tap THP, the above set of equations may be used in generating the following equations as a function of n. Although not shown for the sake of simplicity, a similar set of equations may be obtained by way of using an L-tap THP. The equations for an L-tap THP may be used to establish the same relationships that result from using the case of a 4-tap THP.

$$s_1(n)=\text{Mod}(s_2(n-1)+s_1(n-1)c_1)$$

$$s_2(n)=\text{Mod}(s_3(n-1)+s_1(n-1)c_2)$$

$$s_i(n)=s_{i+1}(n-1)+s_1(n-1)c_i$$

$$s_L(n)=d(n-1)+s_1(n-1)c_L, \text{ where } i \text{ designates the } i^{th} \text{ stage of the } L\text{-tap THP}$$

At step 212, a set of equations may be extrapolated at time (n+1). In the case of a L-tap THP, for example, the above equations for $s_1(n)$, $s_2(n)$, $s_3(n)$, ... and $s_L(n)$ may be expressed as follows:

$$s_1(n+1) = \text{Mod}(s_2(n) + s_1(n)c_1)$$

$$s_2(n+1) = \text{Mod}(s_3(n) + s_1(n)c_2)$$

$$s_i(n+1) = s_{i+1}(n) + s_1(n)c_i$$

$$s_{L-1}(n+1) = s_L(n) + s_1(n)c_{L-1}$$

$$s_L(n+1) = d(n) + s_1(n)c_L$$

Next at step 216, the equations at time n may be substituted into the equations at time (n+1). In the case of a L-tap THP, for example, the following set of equations may be generated:

$$s_1(n+1) = \text{Mod}(\text{Mod}(s_3(n-1) + s_1(n-1)c_2) + \text{Mod}(s_2(n-1) + s_1(n-1)c_1)c_1)$$

$$s_2(n+1) = \text{Mod}(\text{Mod}(n-1) + s_1(n-1)c_3 + \text{Mod}(s_2(n-1) + s_1(n-1)c_1)c_2)$$

$$s_i(n+1) = s_{i+2}(n-1) + s_1(n-1)c_{i+1} + \text{Mod}(s_2(n-1) + s_1(n-1)c_1)c_i$$

$$s_{L-1}(n+1) = d(n-1) + s_1(n-1)c_L + \text{Mod}(s_2(n-1) + s_1(n-1)c_1)c_{L-1}$$

$$s_L(n+1) = d(n) + \text{Mod}(s_2(n-1) + s_1(n-1)c_1)c_L$$

Then, at step 220, the equations at time (n+1) are further simplified. Because of the property of the modulo operator, one of the mod operators may be removed from the preceding equations to yield the following set of equations, for example, in the case of a L-tap THP:

$$s_1(n+1) = \text{Mod}(s_3(n-1) + s_1(n-1)c_2 + \text{Mod}(s_2(n-1) + s_1(n-1)c_1)c_1)$$

$$S_2(n+1) = \text{Mod}(s_4(n-1) + s_1(n-1)c_3 + \text{Mod}(s_2(n-1) + s_1(n-1)c_1)c_2)$$

$$s_i(n+1) = s_{i+2}(n-1) + s_1(n-1)c_{i+1} + \text{Mod}(s_2(n-1) + s_1(n-1)c_1)c_i$$

$$s_{L-1}(n+1) = d(n-1) + s_1(n-1)c_L + \text{Mod}(s_2(n-1) + s_1(n-1)c_1)c_{L-1}$$

$$s_L(n+1) = d(n) + \text{Mod}(s_2(n-1) + s_1(n-1)c_1)c_L$$

The computation of one of the modulo operations in each of the preceding equations may be facilitated using a "lookup table" for $k(n+1)$, wherein $k(n+1)$ is a function of $t_1(n)$, where $t_1(n) = (s_2(n-1) + s_1(n-1)c_1)$:

Therefore, $\text{Mod}(s_2(n-1) + s_1(n-1)c_1) = s_2(n-1) + s_1(n-1)c_1 + 2Mk(n+1)$;

where $k(n+1) = \text{Lookup}(s_2(n-1) + s_1(n-1)c_1) = \text{Lookup}[t_1(n)]$;

wherein $k(n+1)$ is an integer such that the value provided by $s_2(n-1) + s_1(n-1)c_1 + 2Mk(n+1)$ is in a range between $[-M, M)$.

As shown, the modulo operation may be transformed into performing a lookup of the argument of the modulo operator. Since the range of values assumed by $s_1(n-1)$ or $s_2(n-1)$ is independent of L, the range of integer values assumed by $k(n+1)$ is independent of the number of stages in a THP. In the case of a L-tap THP where M=1, for example, the following five equations result after substituting and simplifying the modulo operation in the preceding five equations:

$$s_1(n+1) = \text{Mod}(s_3(n-1) + s_1(n-1)c_2 + s_2(n-1)c_i + s_1(n-1)c_1c_1 + 2k(n-1)c_1)$$

$$s_2(n+1) = \text{Mod}(s_4(n-1) + s_1(n-1)c_3 + s_2(n-1)c_2 + s_1(n-1)c_1c_2 + 2k(n-1)c_2)$$

$$s_i(n+1) = s_{i+2}(n-1) + s_1(n-1)c_{i+1} + s_2(n-1)c_i + s_1(n-1)c_1c_i + 2k(n-1)c_i$$

$$s_{L-1}(n+1) = d(n-1) + s_1(n-1)c_L + s_2(n-1)c_{L-1} + s_1(n-1)c_1c_{L-1} + 2k(n-1)c_{L-1}$$

$$s_L(n+1) = d(n) + s_2(n-1)c_L + s_1(n-1)c_1c_L + 2k(n-1)c_L$$

After rearranging, the five equations may be simplified into the following set of five equations:

$$s_1(n+1) = \text{Mod}(s_1(n-1)(c_1c_1 + c_2) + s_2(n-1)c_1 + s_3(n-1) + 2k(n-1)c_1)$$

$$s_2(n+1) = \text{Mod}(s_1(n-1)(c_1c_2 + c_3) + s_2(n-1)c_2 + s_4(n-1) + 2k(n-1)c_2)$$

$$s_i(n+1) = s_1(n-1)(c_1c_i + c_{i+1}) + s_2(n-1)c_i + s_{i+2}(n-1) + 2k(n-1)c_i$$

$$s_{L-1}(n+1) = s_1(n-1)(c_ic_{L-1} + c_L) + s_2(n-1)c_{L-1} + d(n-1) + 2k(n-1)c_{L-1}$$

$$s_L(n+1) = s_1(n-1)c_1c_L + s_2(n-1)c_L + d(n) + 2k(n-1)c_L$$

In the preceding equations, note that $k(n-1)$ is a discrete time signal that is delayed one clock cycle compared to $k(n+1)$. When the THP is used in conformance to 10GBASE-T standards, $s_1(n) \epsilon [-1,1)$, $s_2(n) \epsilon [-1,1)$, $c_1 \epsilon [-2, 2)$, resulting in the following equality:

$$\text{Range}(s_2(n-1) + s_1(n-1)c_1) = \text{Range}([-1,1) + [-1,1) * [-2, 2)) = (-3, 3)$$

As a consequence of the equality, the value for $k(n-1)$ is limited to the preceding range and the resulting lookup comprises only three possible options (i.e., $k(n-1) \epsilon -1, 0, +1$). Since each of the preceding set of equations, defined at time n+1, is a function of terms defined at time n-1, the clock rate of the Tomlinson-Harashima Precoder (THP) is halved.

Finally, at step 224, the preceding set of equations may be used to implement logic circuitry for a typical stage of a transpose form THP. The logic circuitry, for example, may comprise one or more multipliers, one or more adders, and a multiplexer. The various aspects of the invention are not limited to the 4-tap THP representative embodiment disclosed. The preceding method, as illustrated in the operational flow diagram of FIG. 2, may be adapted for use with any transpose form THP implementation using any number of taps.

Figure 3:
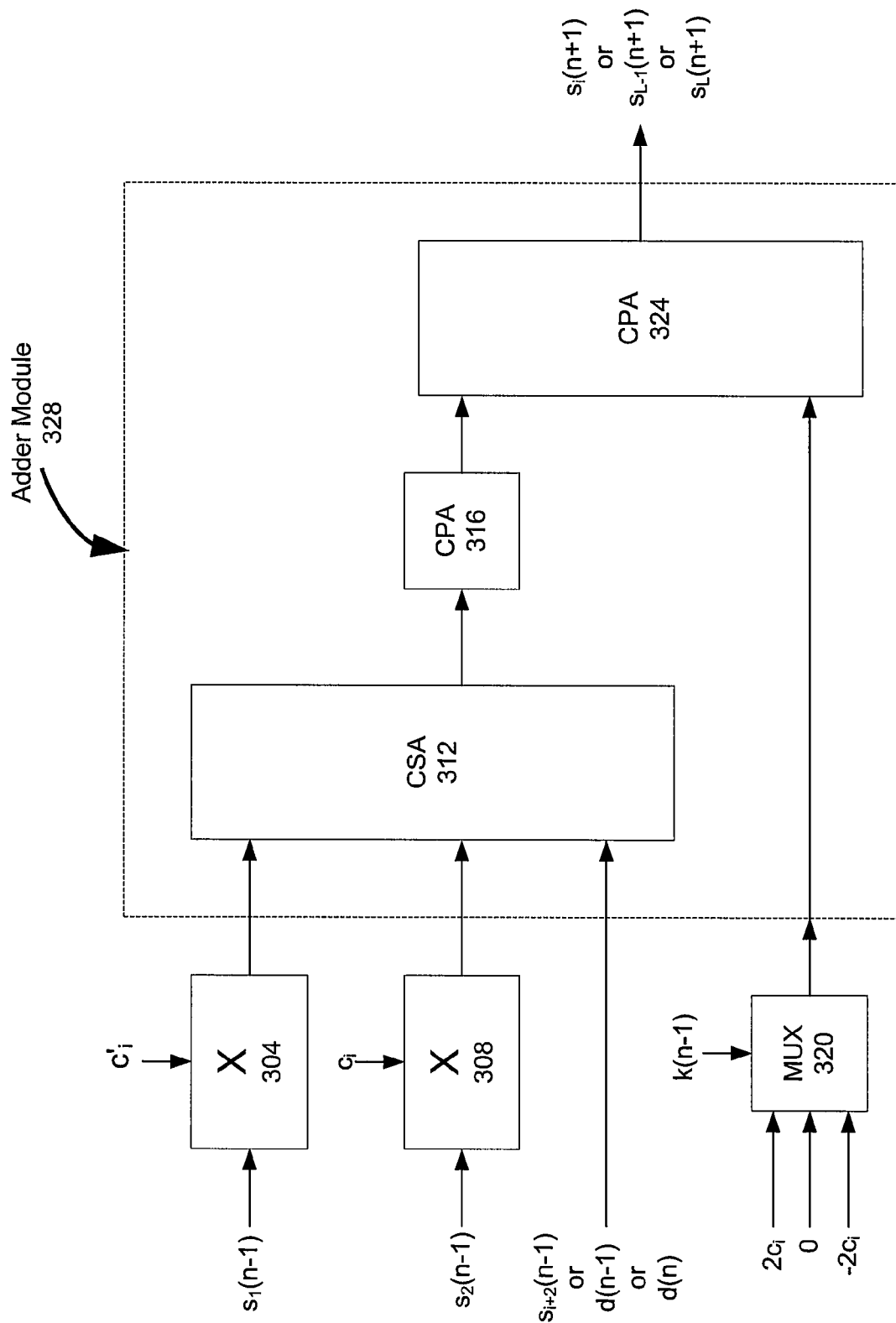
FIG. 3 is a block diagram of a system used to implement a typical stage of a high speed Tomlinson-Harashima Precoder using the method presented in FIG. 2, in accordance with an embodiment of the invention.
Figure 5A:
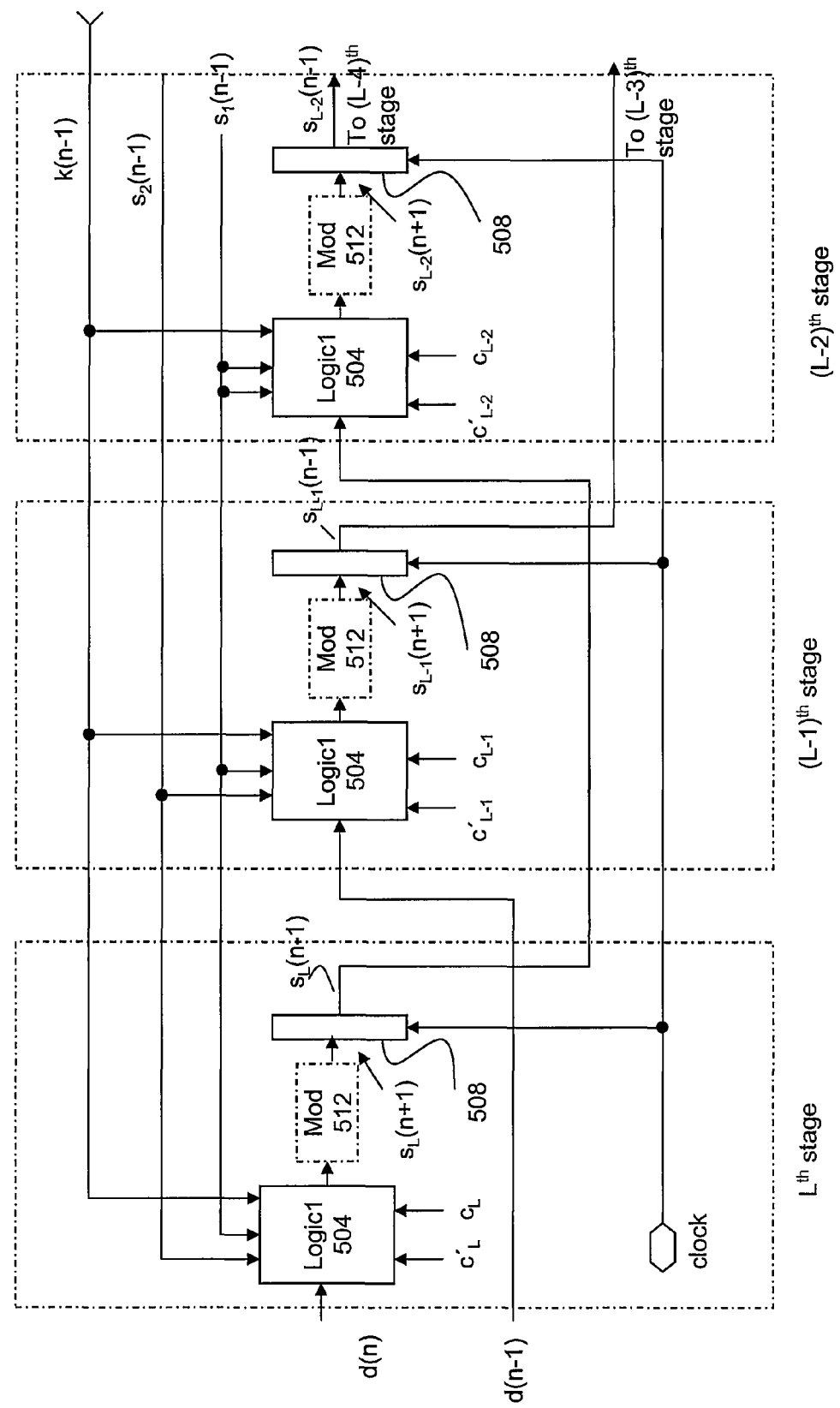
FIGS. 5A and 5B are block diagrams of an implementation of a high speed Tomlinson-Harashima Precoder (THP), in accordance with an embodiment of the invention.
Figure 5B:
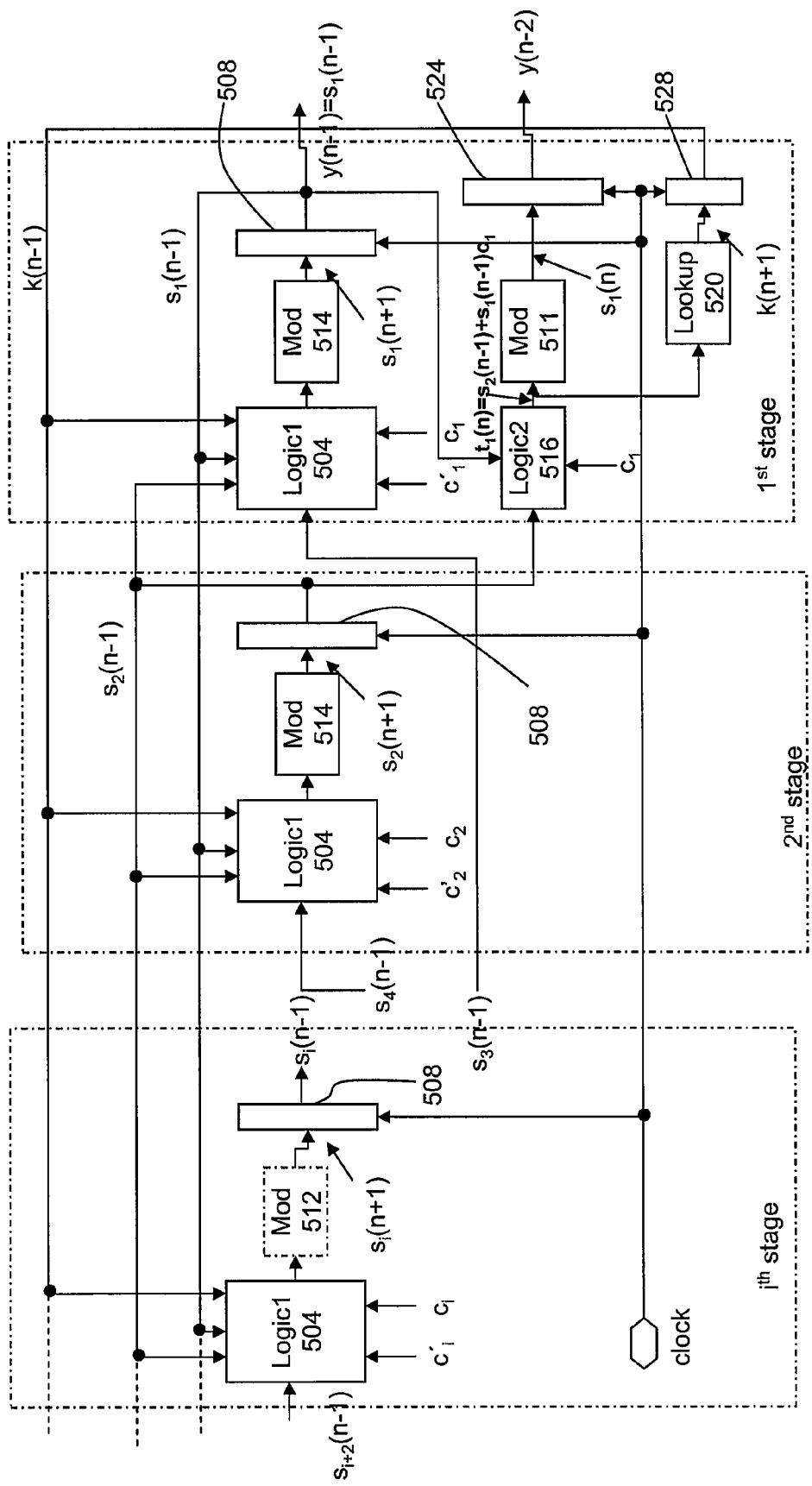

FIG. 3 is a block diagram of a system used to implement a first logic circuitry (i.e., Logic 1 circuitry illustrated in FIGS. 5A and 5B) of a typical stage of a high speed Tomlinson-Harashima Precoder (THP) shown in FIGS. 5A and 5B, using the method presented in FIG. 2, in accordance with an embodiment of the invention. The system comprises a first multiplier 304, a second multiplier 308, a multiplexer 320, and an adder module 328. The adder module 328 may comprise a number of adders. In this representative embodiment, the adder module 328 comprises a carry-save adder (CSA) 312, a first carry-propagate adder (CPA) 316, and a second CPA 324. As may be seen within the adder module 328, a two level CPA architecture is utilized in this representative embodiment. In alternate embodiments, the adder module 328 may comprise one or more adders of one or more types (i.e., CPA, CSA, etc). Each of the multipliers 304, 308 generates an output that is the product of two inputs. As inputs, the multipliers 304, 308 may use one or more digital filter coefficients. The filter coefficients may comprise those used in an adaptive digital filter, such as a block LMS (least mean square) adaptive digital filter, for example. In a representative embodiment, each of the filter coefficients may comprise 16 bits. As shown in FIG. 3, the first multiplier 304 has an input $s_1(n-1)$ and an input $c'_1$, wherein $c'_1=c_1c_1+c_{i+1}$ or $c'_i=c_1c_L$ when i=L. The second multiplier 308 has an input $s_2(n-1)$ and an input $c_i$. The multiplexer 320 may output one of three different inputs. In this representative embodiment, the value of the output of the multiplexer 320 is a function of a selector input, k(n−1). In this representative embodiment, the three inputs to the multiplexer 320 comprise the values $-2c_i$, 0, $+2c_i$. The first CSA 312 utilizes three inputs $(s_{i+2}(n-1), d(n-1), d(n))$; and as indicated in FIG. 3, one of these three inputs is used based on the value of i in the output, $s_i(n+1)$. For example, d(n) is applied as an input when i=L and d(n−1) is applied as an input when i=L−1. The output of the CSA 312 comprises a carry and a sum output. The output of the first CPA 316 comprises a sum output that is input into the second CPA 324. When i=1 or i=2, a modulo (i.e., Modulo$_{2M}$ operations where M=1) operation may be performed to the output generated by the adder module 328. When a modulo 2M operation is performed, for example, the output corresponds to taking the least significant bits (LSBs) of the output. As a consequence, the LSBs of the output may be used when $s_1(n+1)$ or $s_2(n+1)$ is computed. The system described in FIG. 3 may be implemented using any type of digital logic circuitry. The system may be incorporated into an integrated circuit chip or implemented within an integrated circuit chip.

Figure 4:
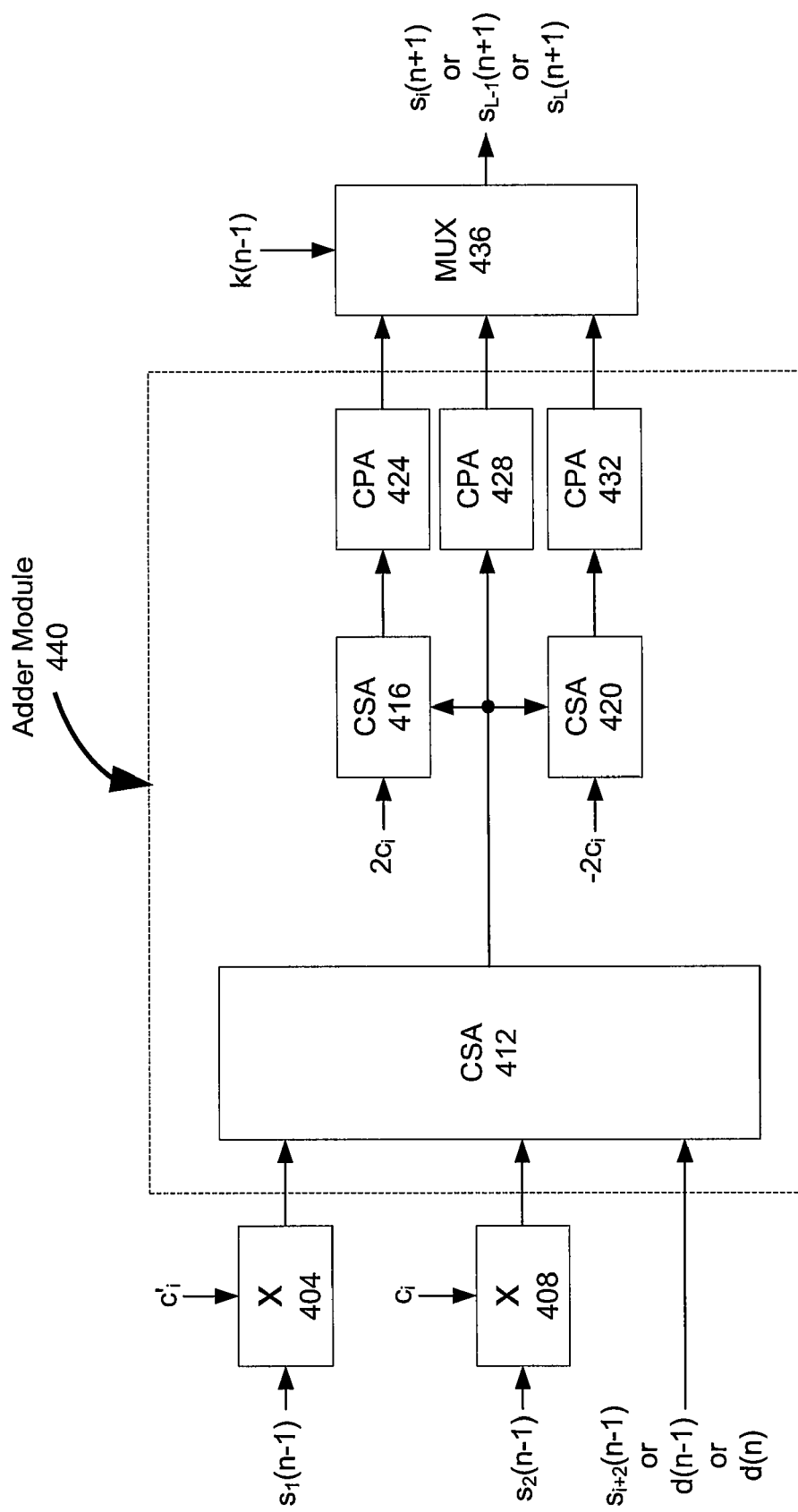
FIG. 4 is a block diagram of a system used to implement a typical stage of a high speed Tomlinson-Harashima Precoder using the method presented in FIG. 2, in accordance with an embodiment of the invention.

FIG. 4 is a block diagram of a system used to implement a first logic circuitry (i.e., Logic 1 circuitry of FIGS. 5A and 5B) of a typical stage of a high speed Tomlinson-Harashima Precoder (THP) shown in FIGS. 5A and 5B, using the method presented in FIG. 2, in accordance with an embodiment of the invention. This representative embodiment may be used if the two level CPA employed in connection with the embodiment of FIG. 3 causes $s_1(n-1)$ or $s_2(n-1)$ to be on a critical processing path of the system. The system comprises a first multiplier 404, a second multiplier 408, a multiplexer 436, and an adder module 440. The adder module 440 may comprise one or more adders of one or more types. In the representative embodiment of FIG. 4, the adder module 440 comprises a first carry-save adder (CSA) 412, a second CSA 416, a third CSA 420, a first carry-propagate adder (CPA) 424, a second CPA 428, and a third CPA 432. As may be seen within the adder module 440, a single level CPA architecture is utilized in this representative embodiment. Each of the multipliers 404, 408 generates an output that is the product of two inputs. As inputs, the multipliers 404, 408 may use one or more digital filter coefficients. The filter coefficients may comprise those used in an adaptive digital filter, such as a block LMS (least mean square) adaptive digital filter, for example. In a representative embodiment, each of the filter coefficients may comprise 16 bits. As shown in FIG. 4, the first multiplier 404 has an input $s_1(n-1)$ and an input $c'_i$, wherein $c'_i=c_1c_i+c_{i+1}$ or $c'_i=c_1c_L$ when i=L. The second multiplier 408 has an input $s_2(n-1)$ and an input $c_i$. The multiplexer 436 may output one of three different inputs. The value of the output of the multiplexer 436 is a function of a selector input, k(n−1). In this representative embodiment, the three inputs to the multiplexer 436 comprise the values $-2c_i$, 0, $+2c_i$, when M=1. The first CSA 412 utilizes three inputs $(s_{i+2}(n-1), d(n-1), d(n))$; and as indicated in FIG. 4, one of these three inputs is used based on the value of i in the output, $s_i(n+1)$. For example, d(n) is applied as an input when i=L while d(n−1) is applied as an input when i=L−1. The output of each of the CSAs 412, 416, 420 comprises a carry and a sum output. The output of each of the CPAs 424, 428, 432 comprises a sum output. When i=1, a modulo 2M operation may be performed on the output of the adder module 440. When a modulo 2M operation is performed, for example, the output corresponds to taking the least significant bits (LSBs) of the output. As a consequence, the LSBs of the output may be used when $s_1(n+1)$ or $s_2(n+1)$ is computed. A transpose form configuration of a THP may be implemented using a plurality of stages, as will be illustrated in FIGS. 5A and 5B. In a representative embodiment, a desired reduction in clock rate is attained by incorporating a modulo operator to a specified number of stages from the second stage in the transpose form configuration of a THP. For example, a modulo operator is incorporated into the second stage of the transpose form configuration of the THP shown in FIG. 1A. After loop-unrolling is performed, the implementation illustrated in FIGS. 5A and 5B results, facilitating the use of a clock rate that is one-half the original clock rate. The system described in FIG. 4 may be implemented using any type of digital logic circuitry. The system may be incorporated into an integrated circuit chip or implemented within an integrated circuit chip.

FIGS. 5A and 5B are block diagrams of an implementation of a high speed transpose form configuration of an L-tap Tomlinson-Harashima Precoder (THP), in accordance with an embodiment of the invention. FIGS. 5A and 5B provide the signal names and signal flows of the L-tap THP. FIGS. 5A and 5B are block diagrams of the $L^{th}$ to (L−2)th stages and the $i^{th}$, $2^{nd}$, and $1^{st}$ stages, respectively, of the high speed Tomlinson-Harashima Precoder (THP), in accordance with an embodiment of the invention. Referring to FIG. 5A, d(n) and d(n−1) are discrete time signal inputs to the THP. The input sequence, d(n), is input into the $L^{th}$ stage of the THP while the input sequence, d(n−1) is input into the $(L-1)^{th}$ stage of the THP. As shown in FIG. 5B, the sequence, y(n−1) and y(n−2), is output by registers 508, 524 of the first stage of the THP.

As illustrated in FIGS. 5A and 5B, each stage comprises a Logic 1 circuitry 504. The Logic 1 circuitry 504 receives inputs $s_2(n-1)$, $s_1(n-1)$, k(n−1), $c'_i$ and $c_i$, wherein $c'_i=c_1c_i+c_{i+1}$ or $c'_i=c_1c_L$ when i=L. For example, the Logic 1 circuitry 504 at the $L^{th}$ stage receives inputs $s_2(n-1)$, $s_1(n-1)$, k(n−1), $c'_L$ and $c_L$, wherein $c'_L=c_1c_L$, while the Logic 1 circuitry 504 at the $1^{st}$ stage receives inputs $s_2(n-1)$, $s_1(n-1)$, k(n−1), $c'_1$ and $c_1$, wherein $c'_i=c_1c_1+c_2$. As was previously mentioned with respect to FIGS. 3 and 4, the filter coefficients, $c_i$, may comprise those coefficients used in an adaptive digital filter, such as a block LMS (least mean square) adaptive digital filter, for example. In a representative embodiment, each of the filter coefficients may comprise 16 bits.

In the representative embodiment shown in FIGS. 5A and 5B, each of the $L^{th}$, through the $3^{rd}$ stages of the THP comprises a Logic 1 circuitry 504, an optional modulo 2M circuitry 512, and a register 508. The optional modulo 2M circuitry 512 may be included in or removed from the implementation since its inclusion or removal does not affect the output of the THP. Each of the $1^{st}$ and $2^{nd}$ stages of the THP comprises a Logic 1 circuitry 504, a modulo 2M circuitry 514, and a register 508. In addition, the $1^{st}$ stage of the THP comprises a Logic 2 circuitry 516, a second modulo 2M circuitry 511, a second register 524, a third register 528, and a Lookup circuitry 520. As was stated previously, the Logic 1 circuitry 504 may comprise the circuitry described in either the embodiment shown in FIG. 3 or the embodiment shown in FIG. 4.

The Logic 2 circuitry 516 comprises any type of logic circuitry used to implement the function $t_1(n)=s_2(n-1)+s_1(n-1)c_1$. The Logic 2 circuitry 516 may comprise a multiplier and an adder, for example. As shown, the Logic 2 circuitry 516 receives $s_2(n-1)$, $s_1(n-1)$, and $c_1$ as inputs.

The Lookup circuitry 520 may comprise any type of logic circuitry used to implement a lookup table. In a representative embodiment, the Lookup circuitry 520 may comprise an addressable memory. The lookup table is used to implement a lookup of $t_1(n)=(s_2(n-1)+s_1(n-1)c_1)$. Thus, $t_1(n)$ comprises a linear combination of $s_2(n-1)$ and $s_1(n-1)$. The output of the lookup, $k(n+1)$ may be expressed by the following equation:

$$k(n+1) = -1 \text{ if } t_1(n) >= M,$$
$$+1 \text{ if } t_1(n) < -M$$
$$0 \text{ otherwise.}$$

Each of the modulo circuitries 511, 512, 514, and the Lookup circuitry 520 is output to a register 508, 524, 528. The registers 508, 524, 528 are clocked by a clock (as shown in FIGS. 5A and 5B) at half the symbol rate of the THP. Therefore, the embodiment illustrated in FIGS. 5A and 5B implements a high speed THP through parallel processing at a clock rate that is one half the symbol rate. Thus, the various aspects of the invention allow one to implement a high speed THP through parallel processing that provides a reduction of the clock rate.

To improve the signal to quantization noise ratio (SQNR) of the THP described in either one of the embodiments described in connection with FIGS. 3 and 4, rounding of computations may be performed as opposed to truncation. In the representative embodiments described in connection with FIGS. 3 and 4, $c'_i$ may be computed using more precision than $c_i$. For example, $c'_i$ may be implemented using double the precision used for implementing $c_i$. In a representative embodiment, a 43 dB SQNR may be attained when using 8 bit values for representing $c_i$ and 14 bit values for representing $c'_i$.

As was previously stated, a desired reduction in clock rate is attained by incorporating a modulo operator to each of a specified number of stages from the second stage in the transpose form configuration of a THP. Thus, the loop-unrolling process described in connection with FIG. 2, as applied to the transpose form configuration shown in FIG. 1A, generates a specified minimum number of stages, in which each stage requires a modulo operator. In other embodiments, a number of additional modulo operators (i.e., z modulo operators) may be successively inserted into one or more previous stages of a transpose form THP without affecting the clock rate used. This may be recognized by realizing that the equality, Mod (a+b)=Mod(Mod(a)+b), for example.

In general, to obtain a THP that runs at a rate equal to $1/(z+1)$ of the original symbol rate, an additional z stages will need to incorporate modulo operators prior to the first stage in a transpose form THP. The resulting THP runs at a rate equal to (original symbol rate)/(z+1) or $[1/(z+1)]$th of the original clock rate. As a consequence, in the case where z=1, as illustrated in the L-tap transpose form THP shown in FIG. 1A, and in the loop-unrolled implementation illustrated in FIGS. 5A and 5B, the clock rate is halved. Furthermore, d(n) and d(n-1) would be processed in parallel to generate y(n) and y(n-1) as corresponding outputs.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method of processing a discrete time sampled sequence by a Tomlinson-Harashima Precoder (THP) comprising:
   receiving a first discrete time sampled sequence by an L-tap Tomlinson-Harashima Precoder (THP);
   receiving a clock signal by said L-tap Tomlinson-Harashima Precoder (THP), said clock signal having a clock rate equal to one half the symbol rate of said discrete time sampled sequence;
   using L state variables to express one or more outputs of said L-tap Tomlinson-Harashima Precoder (THP);
   processing said first discrete time sampled sequence using L coefficients and said L state variables by clocking said first discrete time sampled sequence using said clock signal; and
   outputting a second discrete time sampled sequence by said L-tap Tomlinson-Harashima Precoder.

2. The method of claim 1 wherein said L-tap Tomlinson-Harashima Precoder (THP) comprises a transpose form configuration.

3. The method of claim 1 wherein said L coefficients comprise coefficients of a least mean square adaptive digital filter.

4. The method of claim 1 wherein L equals 16.

5. The method of claim 1 wherein said processing comprises performing a lookup of a linear combination of two of said L state variables, said lookup performed using an addressable memory.

6. The method of claim 5 wherein said lookup outputs a value:
   −1, if the sum of the output of the second stage of said L-tap Tomlinson-Harashima Precoder (THP) and a product is greater than or equal to an integer value, M, wherein said product is equal the output of the first stage of said L-tap THP multiplied by the $c_1$ coefficient of said L coefficients;
   +1, if the sum of the output of the second stage of said L-tap Tomlinson-Harashima Precoder (THP) and a product is less than −M, wherein said product is equal the output of the first stage of said L-tap THP multiplied by the $c_1$ coefficient of said L coefficients; or
   0, if otherwise.

7. The method of claim 1 wherein said processing comprises performing a number of add and multiply operations using said coefficients and said state variables.

8. The method of claim 7 wherein said add operations are performed using one or more carry-save adders.

9. The method of claim 7 wherein said add operations are performed using one or more carry-propagate adders.

10. The method of claim 1 wherein said processing comprises performing a number of modulo 2M operations using said coefficients and said state variables, wherein M corresponds to an integer value.

11. An L-tap Tomlinson-Harashima Precoder (THP) comprising:
    at least one circuitry for receiving a first discrete time sampled sequence; said at least one circuitry for receiving a clock signal, wherein said clock rate is equal to one half the rate of the symbol rate of said first discrete time sampled sequence; said at least one circuitry for receiving L coefficients, said at least one circuitry for using L state variables to express one or more outputs of said L-tap Tomlinson-Harashima Precoder (THP); said at least one circuitry for processing said first discrete time sampled sequence using said L coefficients and said L state variables by clocking said first discrete time sampled sequence using said clock signal; and said at least one circuitry for outputting a second discrete time sampled sequence.

12. The L-tap Tomlinson-Harashima Precoder (THP) of claim 11 wherein said L-tap Tomlinson-Harashima Precoder (THP) comprises a transpose form configuration.

13. The L-tap Tomlinson-Harashima Precoder (THP) of claim 11 wherein said L coefficients comprise coefficients of a least mean square adaptive digital filter.

14. The L-tap Tomlinson-Harashima Precoder (THP) of claim 11 wherein L equals 16.

15. The L-tap Tomlinson-Harashima Precoder (THP) of claim 11 wherein said processing comprises performing a lookup of a linear combination of two of said L state variables, said lookup performed using an addressable memory.

16. The L-tap Tomlinson-Harashima Precoder (THP) of claim 15 wherein said lookup outputs a value:
  −1, if the sum of the output of the second stage of said L-tap Tomlinson-Harashima Precoder (THP) and a product is greater than or equal to an integer value, M, wherein said product is equal the output of the first stage of said L-tap THP multiplied by the $c_1$ coefficient of said L coefficients;
  +1, if the sum of the output of the second stage of said L-tap Tomlinson-Harashima Precoder (THP) and a product is less than −M, wherein said product is equal the output of the first stage of said L-tap THP multiplied by the $c_1$ coefficient of said L coefficients; or
  0, if otherwise.

17. The L-tap Tomlinson-Harashima Precoder (THP) of claim 11 wherein said processing comprises performing a number of add and multiply operations using said coefficients and said state variables.

18. The L-tap Tomlinson-Harashima Precoder (THP) of claim 17 wherein said add operations are performed using one or more carry-save adders.

19. The L-tap Tomlinson-Harashima Precoder (THP) of claim 17 wherein said add operations are performed using one or more carry-propagate adders.

20. The L-tap Tomlinson-Harashima Precoder (THP) of claim 11 wherein said processing comprises performing a number of modulo 2M operations using said coefficients and said state variables, wherein M corresponds to an integer value.

21. An L-tap Tomlinson-Harashima Precoder (THP) comprising:
  a single integrated circuit chip, said integrated circuit chip comprising:
    at least one circuitry for receiving a first discrete time sampled sequence,
    said at least one circuitry for receiving a clock signal, said clock rate equal to one half the rate of the symbol rate of said first discrete time sampled sequence,
    said at least one circuitry for using L state variables to express one or more outputs of said Tomlinson-Harashima Precoder (THP),
    said at least one circuitry for processing said first discrete time sampled sequence using L coefficients and said L state variables by clocking said first discrete time sampled sequence using said clock signal, and
    said at least one circuitry for outputting a second discrete time sampled sequence.

22. The L-tap Tomlinson-Harashima Precoder (THP) of claim 21 wherein said L-tap Tomlinson-Harashima Precoder (THP) comprises a transpose form configuration.

23. The L-tap Tomlinson-Harashima Precoder (THP) of claim 21 wherein said L coefficients comprise coefficients of a least mean square adaptive digital filter.

24. The L-tap Tomlinson-Harashima Precoder (THP) of claim 21 wherein L equals 16.

25. The L-tap Tomlinson-Harashima Precoder (THP) of claim 21 wherein said processing comprises performing a lookup of a linear combination of two of said L state variables, said lookup performed using an addressable memory.

26. The L-tap Tomlinson-Harashima Precoder (THP) of claim 25 wherein said lookup outputs a value:
  −1, if the sum of the output of the second stage of said L-tap Tomlinson-Harashima Precoder (THP) and a product is greater than or equal to an integer value, M, wherein said product is equal the output of the first stage of said L-tap THP multiplied by the $c_1$ coefficient of said L coefficients;
  +1, if the sum of the output of the second stage of said L-tap Tomlinson-Harashima Precoder (THP) and a product is less than −M, wherein said product is equal the output of the first stage of said L-tap THP multiplied by the $c_1$ coefficient of said L coefficients; or
  0, if otherwise.

27. The L-tap Tomlinson-Harashima Precoder (THP) of claim 21 wherein said processing comprises performing a number of add and multiply operations using said coefficients and said state variables.

28. The L-tap Tomlinson-Harashima Precoder (THP) of claim 27 wherein said add operations are performed using one or more carry-save adders.

29. The L-tap Tomlinson-Harashima Precoder (THP) of claim 27 wherein said add operations are performed using one or more carry-propagate adders.

30. The L-tap Tomlinson-Harashima Precoder (THP) of claim 24 wherein said processing comprises performing a number of modulo 2M operations using said coefficients and said state variables, wherein M corresponds to an integer value.

* * * * *